United States Patent
Dondlinger et al.

(10) Patent No.: US 7,444,979 B2
(45) Date of Patent: *Nov. 4, 2008

(54) CRANKCASE OF AN ENGINE

(75) Inventors: Brian P. Dondlinger, Milwaukee, WI (US); Robert P. Marino, Waukesha, WI (US); Sean A. Rusch, Cedarburg, WI (US); Ben M. Lund, Wales, WI (US); John Schanz, Mequon, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/846,367

(22) Filed: Aug. 28, 2007

(65) Prior Publication Data

US 2008/0017026 A1   Jan. 24, 2008

Related U.S. Application Data

(63) Continuation of application No. 11/457,062, filed on Jul. 12, 2006, now Pat. No. 7,261,081, which is a continuation of application No. 11/173,181, filed on Jul. 1, 2005, now Pat. No. 7,096,846.

(51) Int. Cl.
*F01M 1/02* (2006.01)
*F01M 1/04* (2006.01)
*F02B 75/22* (2006.01)

(52) U.S. Cl. .............. 123/196 R; 123/195 R; 123/196 CP

(58) Field of Classification Search .......... 123/196 R, 123/196 CP, 195 R

See application file for complete search history.

(56) References Cited

U.S. PATENT DOCUMENTS

| | | | |
|---|---|---|---|
| 4,688,523 | A | 8/1987 | Takahashi et al. |
| 4,736,809 | A | 4/1988 | Kumazawa |
| 5,495,833 | A | 3/1996 | Ishizaka et al. |
| 6,073,719 | A | 6/2000 | Ohmika et al. |

FOREIGN PATENT DOCUMENTS

| | | |
|---|---|---|
| EP | 0610165 | 8/1994 |
| JP | 59113230 | 6/1984 |
| JP | 6416486 | 1/1989 |
| JP | 3104795 | 5/1991 |
| JP | 03189314 | 8/1991 |
| JP | 763034 | 3/1995 |
| JP | 8312322 | 11/1996 |
| JP | 9250323 | 9/1997 |

*Primary Examiner*—Noah Kamen
(74) *Attorney, Agent, or Firm*—Michael Best & Friedrich LLP

(57) ABSTRACT

The present invention provides a motorcycle including a front wheel, a rear wheel, a frame supported by the front and rear wheels, a crankcase including a first interface portion and a first passageway exposed to the first interface portion, a reservoir located remotely from the crankcase adapted to contain a lubricant, and a transmission case supported by the frame and including a second interface portion and a second passageway exposed to the second interface portion. The second passageway is in fluid communication with the reservoir. The first interface portion is coupled to the second interface portion. The first passageway is in fluid communication with the second passageway. The first and second passageways provide fluid communication between the reservoir and the crankcase through the first and second interface portions.

6 Claims, 8 Drawing Sheets

CRANKCASE OF AN ENGINE

RELATED APPLICATIONS

This application is a continuation of U.S. patent application Ser. No. 11/173,181 filed on Jul. 1, 2005, now U.S. Pat. No. 7,096,846, issued Aug. 29, 2006, and a continuation of U.S. patent application Ser. No. 11/457,062 filed on Jul. 12, 2006, now U.S. Pat. No. 7,261,081 issued Aug. 28, 2007, the entire contents of which is incorporated herein by reference.

FIELD OF THE INVENTION

This invention relates generally to motorcycles, and more particularly to motorcycle engines and transmissions.

BACKGROUND OF THE INVENTION

Lubrication systems in motorcycle engines and transmissions commonly include an oil pan defining an oil reservoir, an oil pump configured to draw oil from the reservoir, an oil return hose to return oil to the reservoir, and an oil feed hose communicating the reservoir and the inlet of the oil pump. The oil pan can be mounted remotely from the engine adjacent and below the transmission. Due to the oil pan's remote positioning from the engine, the lubrication system requires external hoses extending from the oil reservoir to the engine for providing oil to, and receiving oil from, the engine.

Motorcycle engines and transmissions also typically include external vent hoses communicating the crankcase of the engine and the transmission case of the transmission.

SUMMARY OF THE INVENTION

The present invention provides, in one aspect, a motorcycle including a front wheel, a rear wheel, a frame supported by the front and rear wheels, a crankcase including a first interface portion and a first passageway exposed to the first interface portion, a reservoir located remotely from the crankcase adapted to contain a lubricant, and a transmission case supported by the frame and including a second interface portion and a second passageway exposed to the second interface portion. The second passageway is in fluid communication with the reservoir. The first interface portion is coupled to the second interface portion. The first passageway is in fluid communication with the second passageway. The first and second passageways are adapted to provide fluid communication between the reservoir and the crankcase through the first and second interface portions.

Other features and aspects of the present invention will become apparent to those skilled in the art upon review of the following detailed description, claims and drawings.

BRIEF DESCRIPTION OF THE DRAWINGS

In the drawings, wherein like reference numerals indicate like parts.

Figure 1:
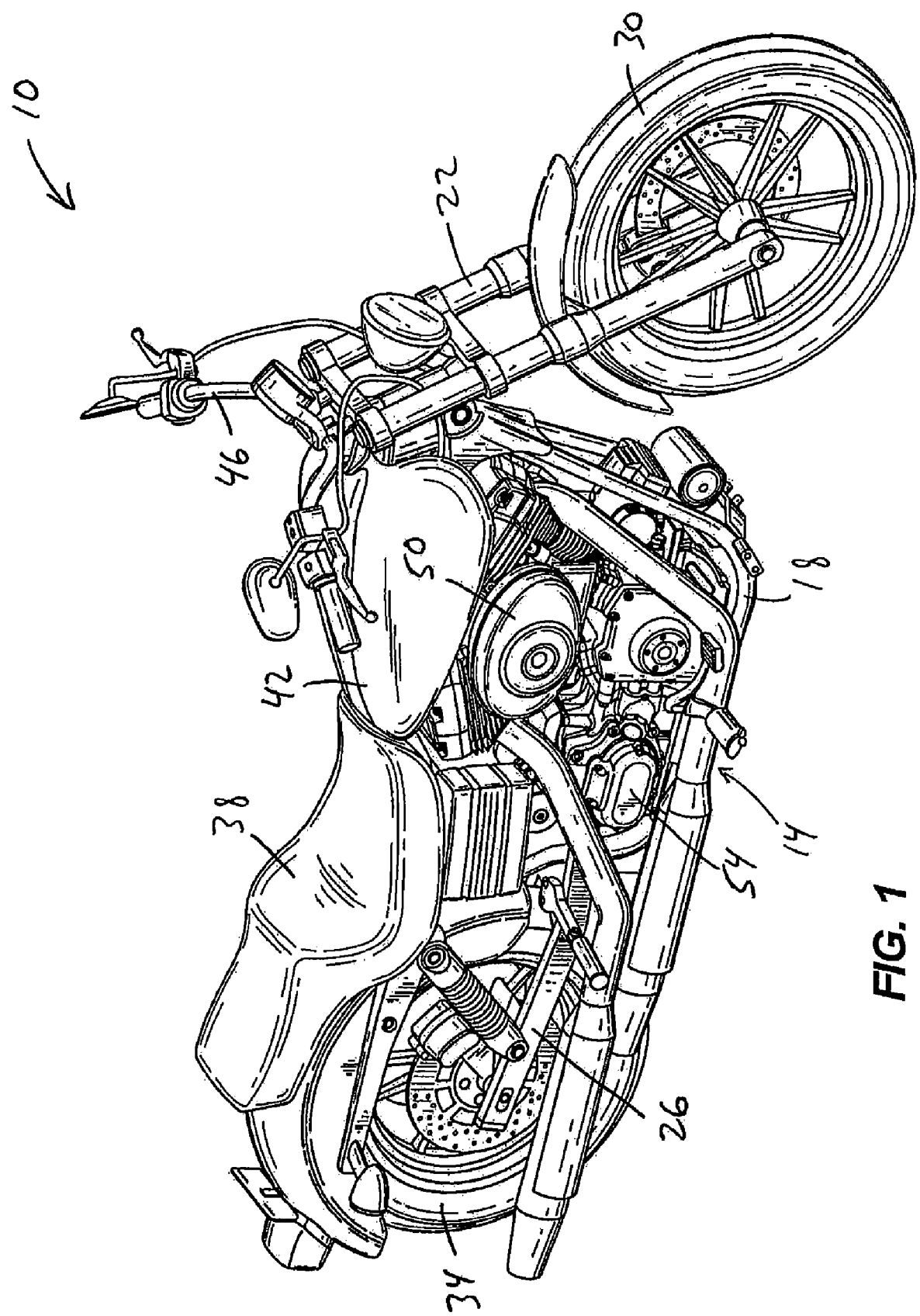
FIG. 1 is a front perspective view of a motorcycle embodying the present invention.

Before any features of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having", and "comprising" and variations thereof herein is meant to encompass the items listed thereafter and equivalents thereof as well as additional items. The use of letters to identify elements of a method or process is simply for identification and is not meant to indicate that the elements should be performed in a particular order.

DETAILED DESCRIPTION

FIG. 1 illustrates a motorcycle 10 including a drive assembly 14, a frame 18, a front fork assembly 22, a swing arm or rear fork assembly 26, a front wheel 30, a rear wheel 34, a seat 38, and a fuel tank 42. The frame 18 supports the drive assembly 14, the front fork assembly 22, the rear fork assembly 26, the seat 38, and the fuel tank 42. The front fork assembly 22 is pivotally supported at a front end of the motorcycle 10 and supports the front wheel 30. The front fork assembly 22 includes a pair of handle bars 46 for steering the motorcycle 10. The rear fork assembly 26 is coupled to the frame 18 at a rear end of the motorcycle 10 and rotatably supports the rear wheel 34. The seat 38 is coupled to the frame 18 and is configured for supporting a rider. The fuel tank 42 is supported by the frame 18 and provides fuel to the drive assembly 14.

The drive assembly 14 is coupled to the frame 18 beneath the seat 38 between the front wheel 30 and the rear wheel 34 of the motorcycle 10. With continued reference to FIG. 1, the drive assembly 14 includes an engine 50 and a transmission 54, which comprise distinct, independent components of the drive assembly 14. The engine 50 comprises a V-twin engine 50 supported by the frame 18 forward of the transmission 54. The engine 50 includes an output shaft (not shown), such as a crankshaft, which includes a primary drive sprocket (not shown) for driving a primary chain (not shown) in a conventional manner to power the transmission 54.

The transmission 54 includes a transmission case assembly 58 including a transmission case 62 enclosing the internal components (not shown) of the transmission 54. A gear chamber (not shown) in the transmission case 62 houses the internal components of the transmission 54, particularly the transmission input and output shafts and various gears (not shown). Transmission lubricant is contained within the gear chamber to lubricate the working components of the transmission 54 (e.g., the input and output shafts and various gears). The transmission case assembly 58 also includes a pan 66 coupled to the transmission case 62. The pan 66 defines a reservoir or a sump for containing engine lubricant, which is distributed throughout the engine 50 to lubricate the working components of the engine 50. The engine lubricant is kept separately from the transmission lubricant, such that there is no cross-contamination between the engine lubricant and transmission lubricant.

The engine 50 includes a crankcase 70 and dual pumps (not shown) supported by the crankcase 70 and configured to transport lubricant throughout the engine 50 and transmission 54. Specifically, a first pump is configured to scavenge lubricant from the sump and pump the lubricant to the engine 50 to lubricate the working components of the engine 50. A second pump is configured to scavenge lubricant used by the engine 50 and pump the lubricant back to the sump. Both of the first pump and the second pump are mechanically driven by the crankshaft of the engine 50.

Figure 2:
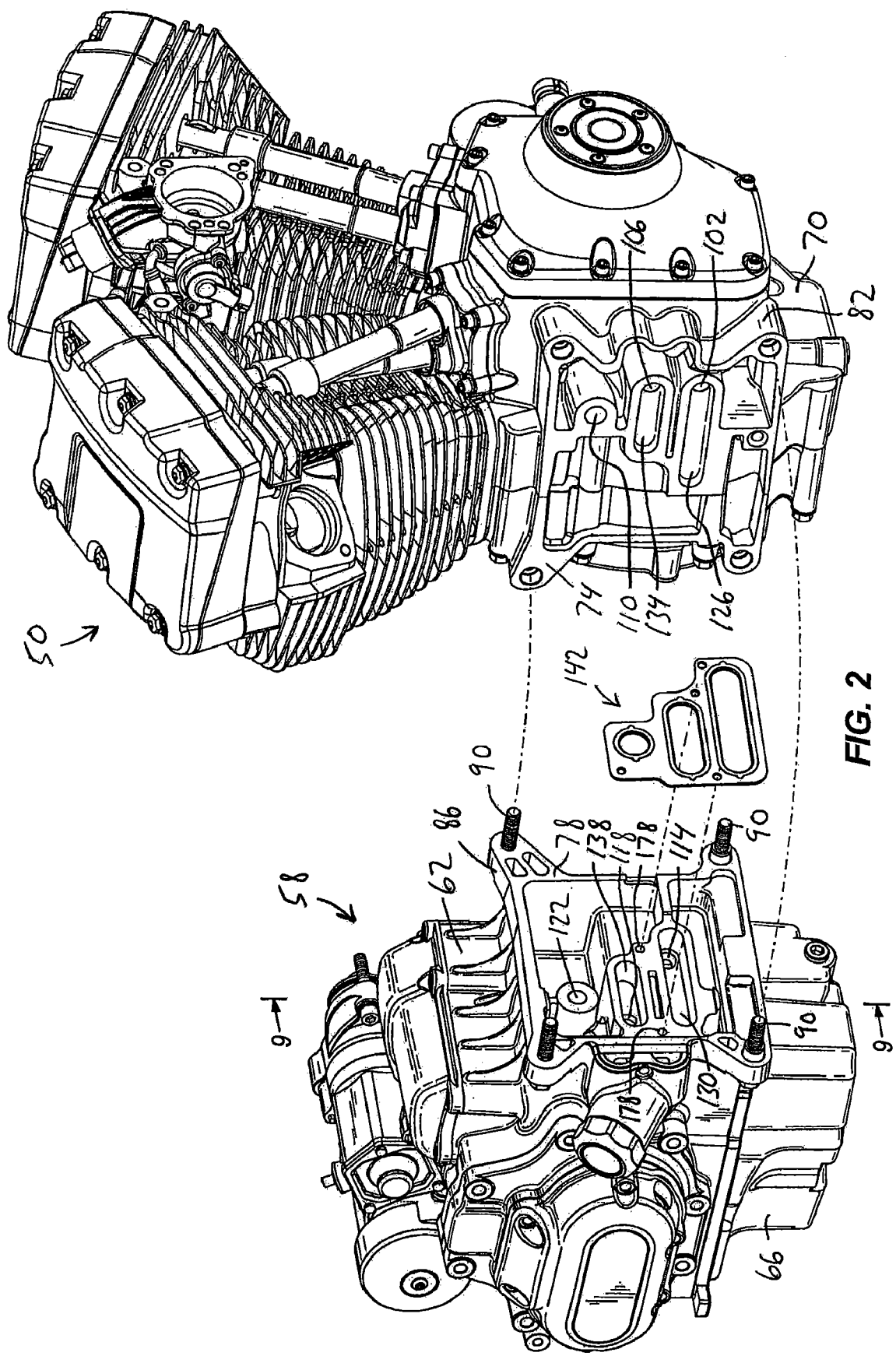
FIG. 2 is an exploded, perspective view of an engine and transmission case assembly of the motorcycle of FIG. 1, illustrating a gasket positioned between the engine and transmission case assembly.
Figure 9:
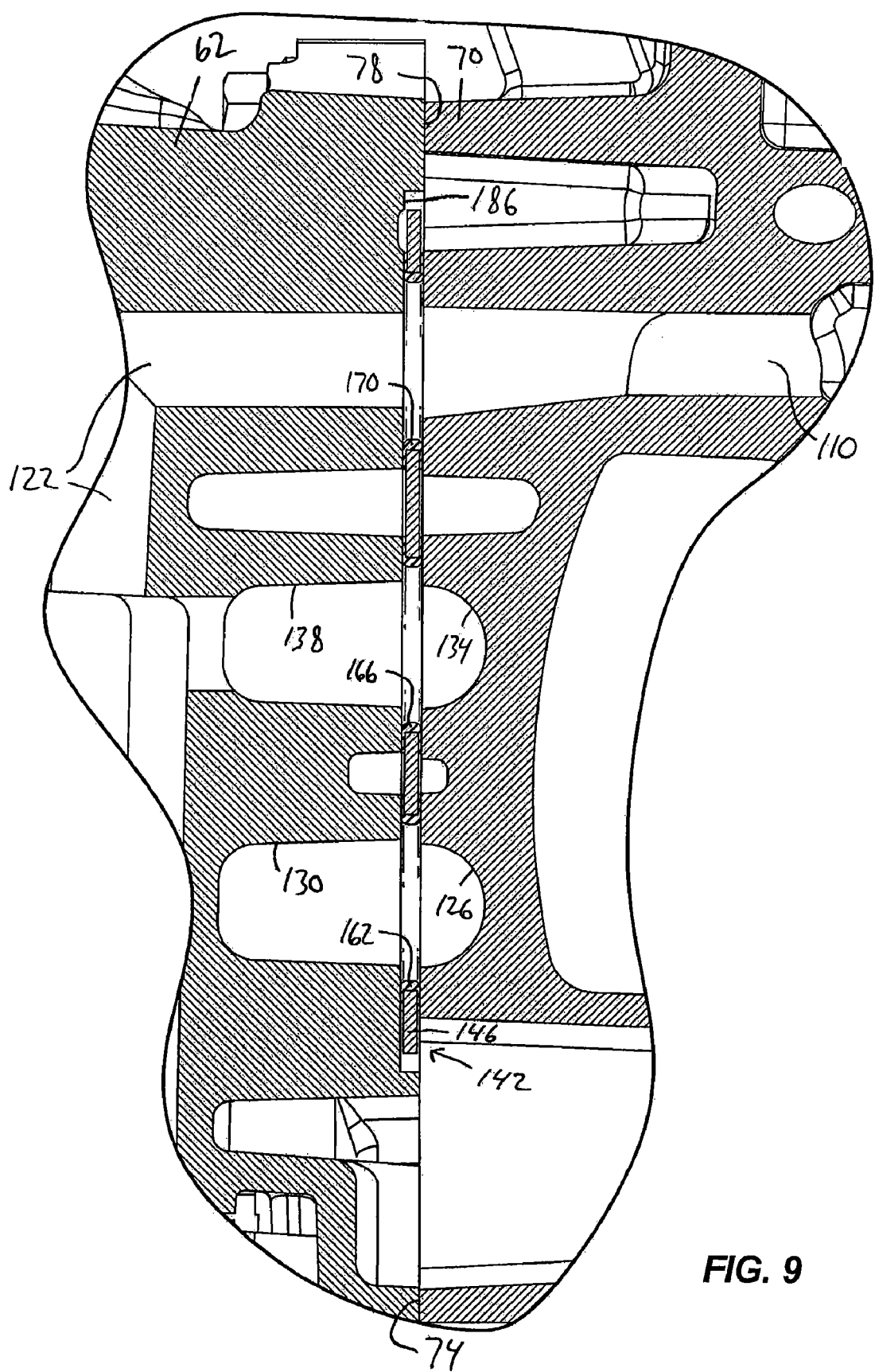
FIG. 9 is a cross-section view taken along line 9-9 of FIG. 2.

With reference to FIGS. 2 and 9, the crankcase 70 and transmission case 62 are coupled along respective first and second interface portions 74, 78. In the illustrated construction, the first and second interface portions 74, 78 are supported by respective flanges 82, 86 on the crankcase 70 and the transmission case 62. Multiple fasteners may be used to couple the respective flanges 82, 86 of the crankcase 70 and the transmission case 62. In the illustrated construction, bolts 90 are used to couple the flanges 82, 86, but other fasteners may be used in alternate constructions.

Figure 10:
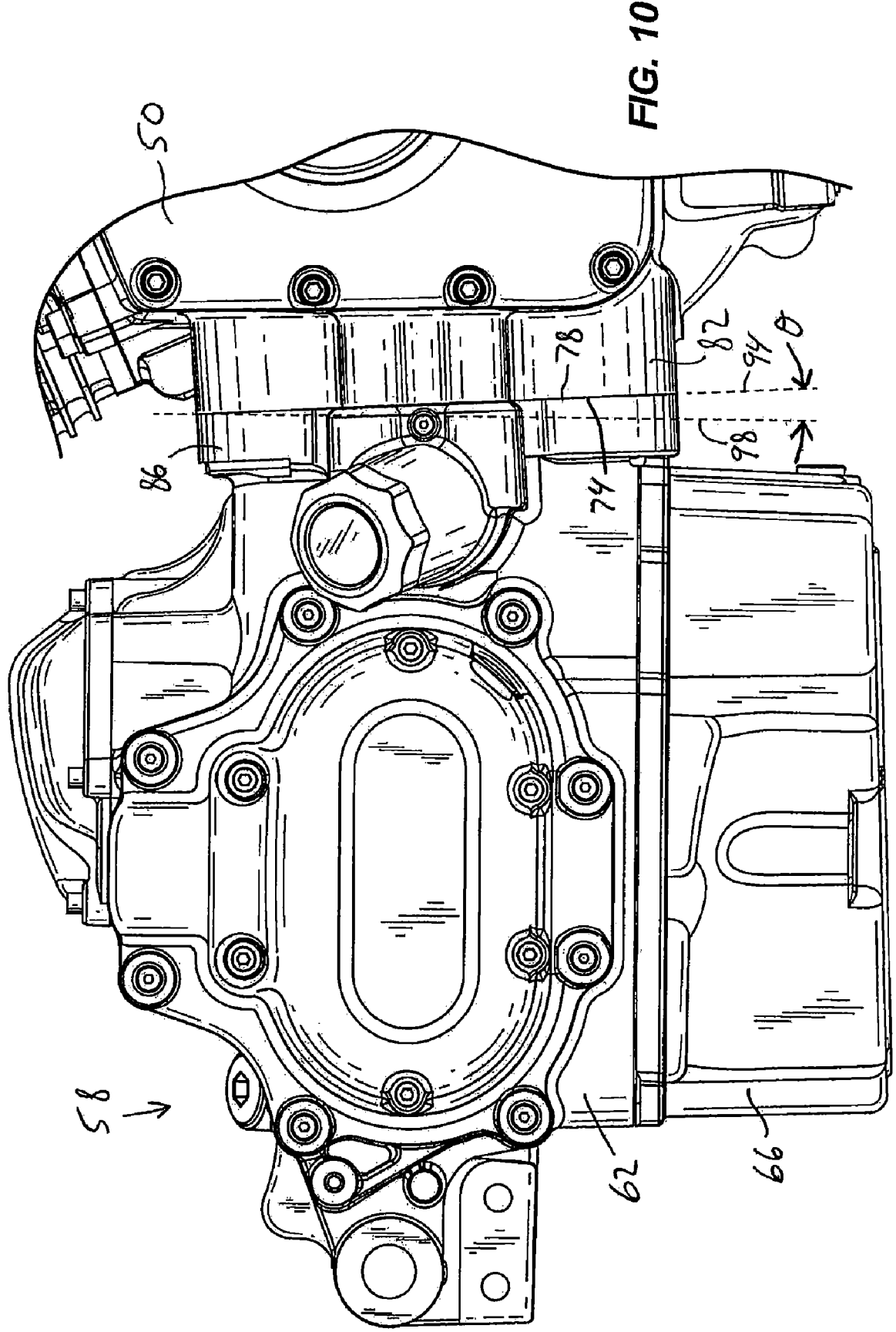
FIG. 10 is a side view of the engine and transmission case assembly of FIG. 2.

With reference to FIG. 10, the first and second interface portions 74, 78 define a plane 94 when the first and second interface portions 74, 78 are coupled. The plane 94 is angularly oriented or canted relative to a vertical plane 98 passing through the second interface portions 78. In the illustrated construction, the plane 94 is canted relative to the vertical plane 98 by an angle $\theta$ of about 3 degrees. Alternatively, the plane 94 may be canted relative to the vertical plane 98 more or less than about 3 degrees.

With reference to FIG. 2, the engine 50 and transmission case assembly 58 includes a plurality of internal passageways throughout the crankcase 70 and transmission case 62. Specifically, with reference to the engine 50, a lubricant feed passageway 102 in the crankcase 70 is in fluid communication with the inlet of the first pump, such that lubricant from the sump is drawn through the lubricant feed passageway 102 by operation of the first pump. The crankcase 70 also includes a lubricant return passageway 106 in fluid communication with the outlet of the second pump, such that lubricant used by the engine 50 is discharged by the second pump through the lubricant return passageway 106 toward the sump. The crankcase 70 further includes a vent passageway 110 in fluid communication with one or more of a crankshaft chamber (not shown) and a camshaft chamber (not shown) in the crankcase 70. Each of the feed passageway 102, return passageway 106, and vent passageway 106 are exposed to the first interface portion 74 of the crankcase 70.

With reference to the transmission 54, a lubricant feed passageway 114 in the transmission case 62 is in fluid communication with the sump, such that lubricant from the sump is drawn through the lubricant feed passageway 114 by operation of the first pump. The transmission case 62 also includes a lubricant return passageway 118 in fluid communication with the sump, such that lubricant used by the engine 50 is returned to the sump by operation of the second pump. The transmission case 62 further includes a vent passageway 122 in fluid communication with the sump. Each of the feed passageway 114, return passageway 118, and vent passageway 122 are exposed to the second interface portion 78 of the transmission case 62.

Upon coupling the crankcase 70 and transmission case 62 along the respective first and second interface portions 74, 78, the respective feed passageways 102, 114, return passageways 106, 118, and vent passageways 110, 122 are in fluid communication with each other across the first and second interface portions 74, 78. During operation of the motorcycle 10, the first pump draws lubricant from the sump, through the respective feed passageways 114, 102 of the transmission case 62 and the crankcase 70, pressurizes the lubricant, and discharges the pressurized lubricant to the working components of the engine 50 (see FIG. 6). Likewise, the second pump draws "used" lubricant form the crankcase 70, pressurizes the used lubricant, and discharges the pressurized lubricant toward the sump through the respective return passageways 106, 118 of the crankcase 70 and the transmission case 62 (see FIG. 7).

Also, during operation of the motorcycle 10, the respective vent passageways 110, 122 in the crankcase 70 and transmission case 62 fluidly communicate the crankshaft and/or camshaft chambers in the crankcase 70 and the sump (see FIG. 8) to substantially equalize the vapor pressure in the engine 50 and the transmission 54, allowing the level of lubricant in the sump to rise and fall.

Figure 6:
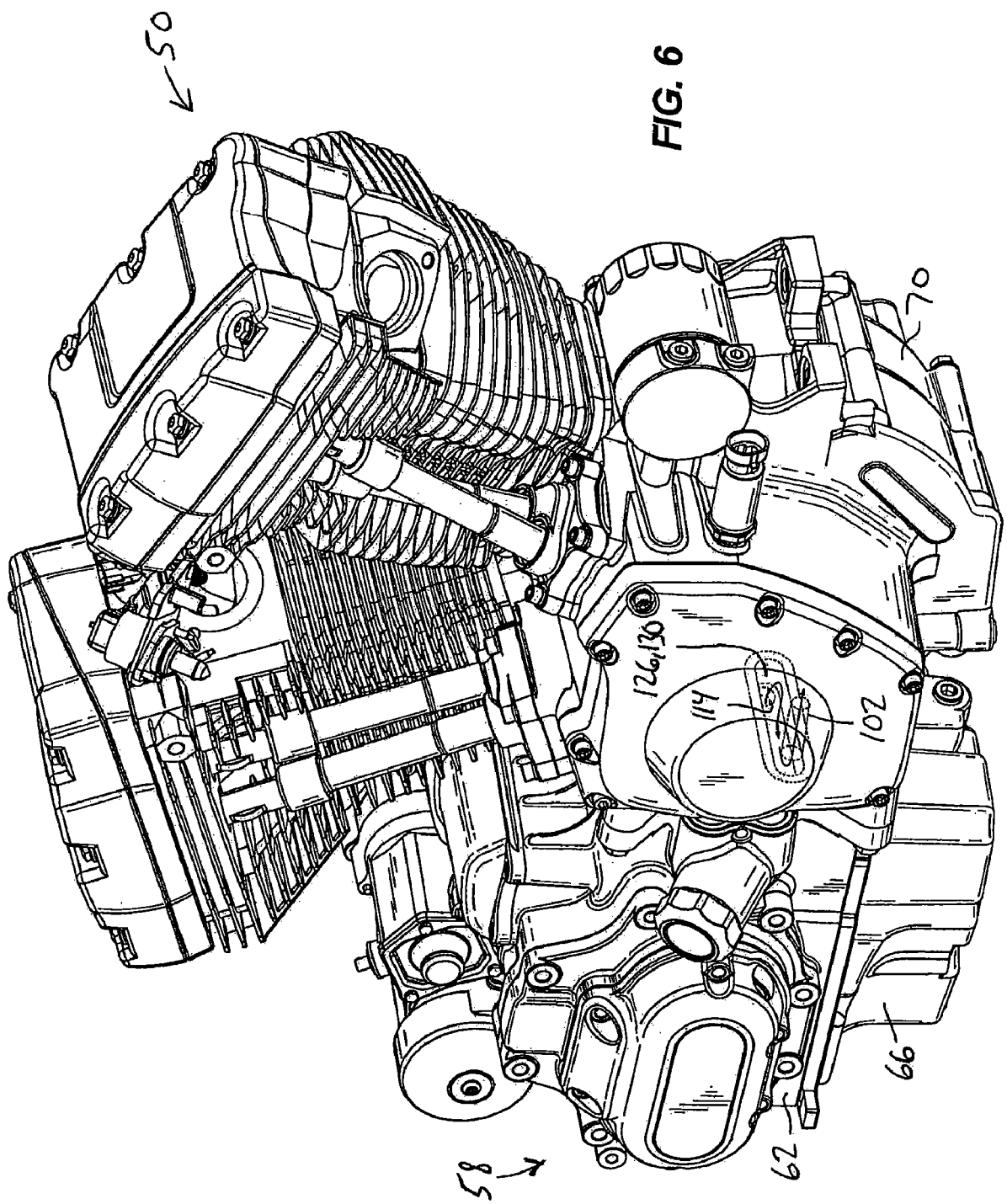
FIG. 6 is an assembled, perspective view of the engine and transmission case assembly of FIG. 2, illustrating a lubricant feed passageway through the engine and transmission case assembly.
Figure 7:
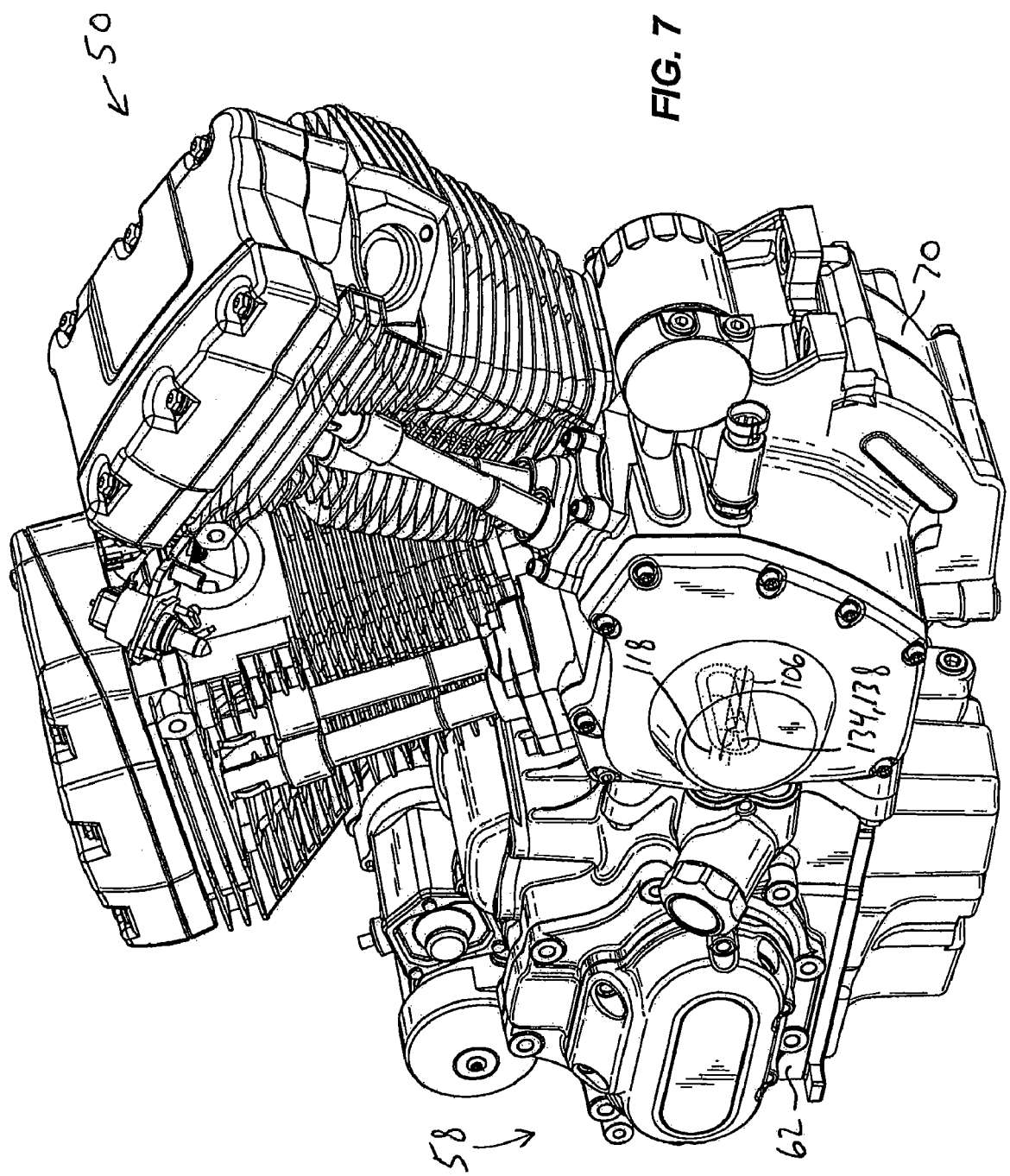
FIG. 7 is an assembled, perspective view of the engine and transmission case assembly of FIG. 2, illustrating a lubricant return passageway through the engine and transmission case assembly.
Figure 8:
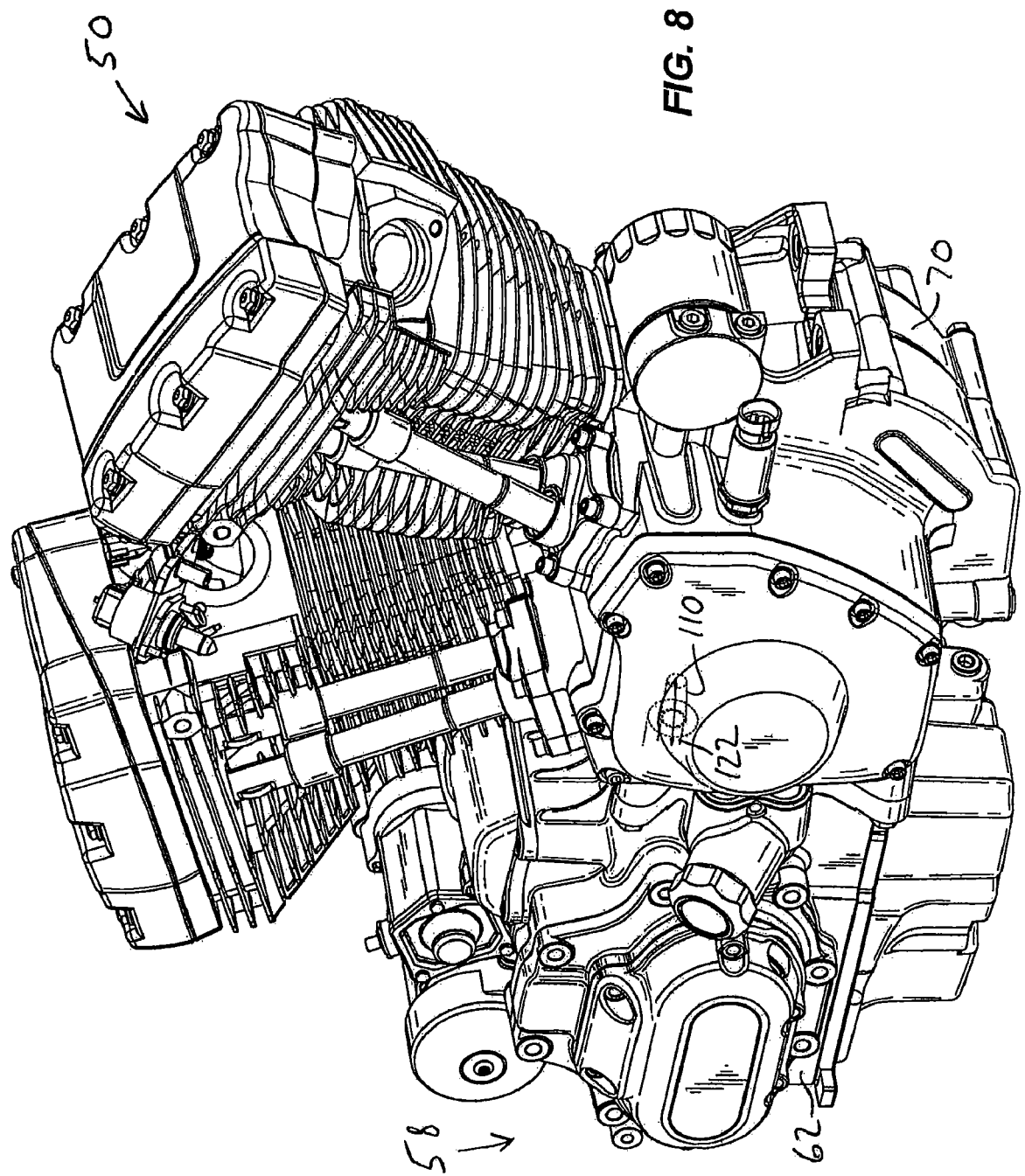
FIG. 8 is an assembled, perspective view of the engine and transmission case assembly of FIG. 2, illustrating a vent passageway through the engine and transmission case assembly.

With continued reference to FIG. 8, the respective vent passageways 110, 122 in the crankcase 70 and the transmission case 62 are aligned when the first and second interface portions 74, 78 are coupled. With reference to FIGS. 6 and 7, however, the respective feed passageways 102, 114 and the respective return passageways 106, 118 in the crankcase 70 and transmission case 62 are offset when the first and second interface portions 74, 78 are coupled. With reference to FIGS. 2 and 9, respective channels 126, 130 in the first and second interface portions 74, 78 fluidly communicate the offset feed passageways 102, 114 when the first and second interface portions 74, 78 are coupled. Likewise, respective channels 134, 138 in the first and second interface portions 74, 78 fluidly communicate the offset return passageways 106, 118 when the first and second interface portions 74, 78 are coupled.

In the illustrated construction, channels 126, 134 are formed in the first interface portion 74, and channels 130, 138 are formed in the second interface portion 78. In an alternate construction, the channels may be formed in only one of the first and second interface portions 74, 78 to fluidly communicate the offset passageways 102, 114 and 106, 118. In another alternate construction, the respective feed passageways 102, 114 and the respective return passageways 106, 118 may be configured in the crankcase 70 and transmission case 62 to be aligned when the first and second interface portions 74, 78 are coupled.

With reference to FIG. 2, a gasket 142 is positioned between the engine 50 and transmission case assembly 58 to seal the respective feed passageways 102, 114, return passageways 106, 118, and vent passageways 110, 122. The gasket 142 includes a base plate 146, a plurality of apertures 150, 154, 158 through the base plate 146, and a plurality of seals 162, 166, 170 coupled to the base plate 146 around the apertures 150, 154, 158 (see FIGS. 3 and 4). Specifically, the aperture 150 allows fluid communication between the feed passageways 102, 114 when the first and second interface portions 74, 78 are coupled, the aperture 154 allows fluid communication between the return passageways 106, 118 when the first and second interface portions 74, 78 are coupled, and the aperture 158 allows fluid communication between the vent passageways 110, 122 when the first and second interface portions 74, 78 are coupled.

Figure 3:
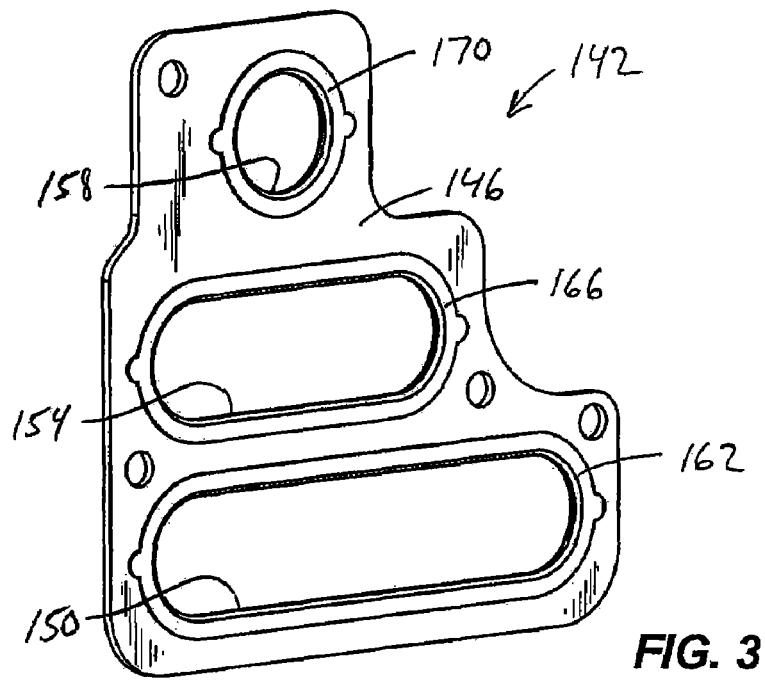
FIG. 3 is an enlarged, front perspective view of the gasket of FIG. 2.

As shown in FIGS. 2 and 3, the aperture 150 is sized to accommodate the respective channels 126, 130 in the first and second interface portions 74, 78, the aperture 154 is sized to accommodate the respective channels 134, 138 in the first and second interface portions 74, 78, and the aperture 150 is sized to accommodate the respective vent passageways 110, 122 in the first and second interface portions 74, 78. In the illustrated construction, the seals 162, 166, 170 are bonded to the base plate 146 around the periphery of the respective apertures 150, 154, 158. The seals 162, 166, 170 are made from an elastomeric material (e.g., rubber) to allow compression of the seals 162, 166, 170 upon coupling the first and second interface portions 74, 78.

Figure 4:
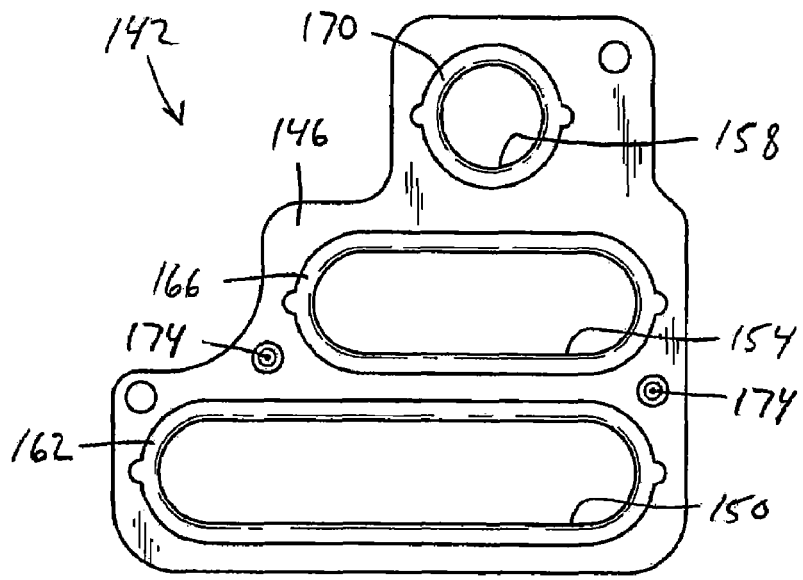
FIG. 4 is a top view of the gasket of FIG. 2.
Figure 5:
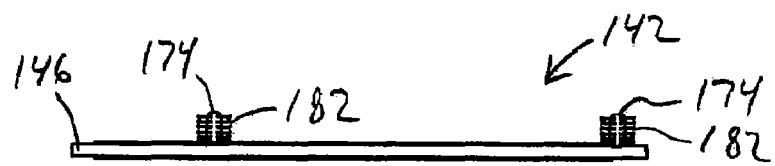
FIG. 5 is an end view of the gasket of FIG. 2.

With reference to FIGS. 4-5, the gasket 142 includes clips 174 for retaining the gasket 142 to at least one of the first interface portion 74 and second interface portion 78. In the illustrated construction, the gasket 142 utilizes two clips 174. However, alternate constructions of the gasket 142 may utilize more or less than two clips 174 to retain the gasket 142 to the second interface portion 78. Also, in the illustrated construction, the clips 174 engage holes 178 in the second interface portion 78. Alternate constructions of the gasket 142, crankcase 70, and transmission case 62 may include holes in the first interface portion 74 which the clips 174 may engage to retain the gasket 142 to the first interface portion 74. As shown in FIG. 5, the clips 174 include a plurality of barbs 182 for resisting disengagement from the holes 178.

With reference to FIG. 9, the base plate 146 of the gasket 142 is positioned within a recessed portion 186 of the second interface portion 78. In an alternate construction, however, the recessed portion 186 may be incorporated in the first interface portion 74, or both the first and second interface portions 74, 78. The recessed portion 186 is sized such that, upon coupling the first and second interface portions 74, 78, the seals 162, 166, 170 are compressed without clamping the base plate 146 between the first and second interface portions 74, 78. The base plate 146 merely serves to orient the seals 162, 166, 170 with respect to the channels 126, 134 in the crankcase 70, the channels 130, 138 in the transmission case 62, and the vent passageways 110, 122. By not clamping the base plate 146 between the respective flanges 82, 86 of the first and second interface portions 74, 78, tolerance stacking between the flanges 82, 86 and the base plate 146 is reduced.

Various aspects of the invention are set forth in the following claim.

We claim:

1. A crankcase adapted for use with a motorcycle including a transmission case assembly having a first interface portion, a first passageway exposed to the first interface portion, and a reservoir located remotely from the crankcase adapted to contain a lubricant, the crankcase comprising:
   a second interface portion adapted to be coupled to the first interface portion; and
   a second passageway exposed to the second interface portion, the first and second passageways adapted to provide fluid communication between the reservoir and the crankcase through the first and second interface portions when the first and second interface portions are coupled.

2. The crankcase of claim 1, wherein the second passageway comprises a portion of a lubricant return passageway through which lubricant is transported from the crankcase to the reservoir.

3. The crankcase of claim 1, further comprising a channel formed in the second interface portion, wherein the channel is adapted to fluidly communicate the second passageway and the first passageway.

4. The crankcase of claim 1, the transmission case assembly including a third passageway exposed to the first interface portion, further comprising:
   a fourth passageway exposed to the second interface portion, wherein a combination of the first and second passageways comprises a lubricant feed passageway through which lubricant is transported from the reservoir to the crankcase, and wherein a combination of the third and fourth passageways comprises a lubricant return passageway through which lubricant is transported from the crankcase to the reservoir.

5. The crankcase of claim 4, the transmission case assembly including a fifth passageway exposed to the first interface portion, further comprising:
   a sixth passageway exposed to the second interface portion, wherein a combination of the fifth and sixth passageways comprises a vent passageway through which vapor is transported between the crankcase and the reservoir.

6. The crankcase of claim 1, wherein the first and second interface portions define a plane when the first and second interface portions are coupled, and wherein the plane is angularly oriented relative to a vertical plane passing through at least one of the first and second interface portions between about 1 degree and about 5 degrees.

* * * * *